April 20, 1943.            C. J. KOENIG              2,317,201
                             FASTENER
                        Filed May 25, 1942

INVENTOR
Carl J. Koenig
BY
O.Z.McCoy
ATTORNEY

Patented Apr. 20, 1943

2,317,201

UNITED STATES PATENT OFFICE 2,317,201

FASTENER

Carl J. Koenig, Kenmore, N. Y., assignor of one-third to Paul O. Mix, Cleveland, Ohio, and one-third to Clarence Hanks, Euclid, Ohio Application May 25, 1942, Serial No. 444,317

6 Claims. (Cl. 85—5)

This invention relates to fasteners and more particularly to an improved temporary fastener that is adapted for holding a plurality of overlying apertured plates with their holes in concentric alignment with each other preparatory to the permanent securing together of the plates, or to the drilling of additional holes therein.

In the past various forms of temporary fasteners have appeared on the market for holding plates in position preparatory to securing them together permanently with rivets, bolts or other means. The hole occupying parts of the more successful of these fasteners comprise a pin on which a wedge, lug, or finger of substantially crescent section, or a cylindrical bushing or the like, is slidable axially of the pin. The pin is first inserted into the plate holes and then the wedge, finger or bushing is caused to slide axially of the pin to bring the edges of the plate holes into concentric registration with each other. Devices of this general type, wherein the hole occupying part of the device consists of a plurality of parts that slide axially with respect to each other are unnecessarily troublesome in use. The mechanical limitations of these devices result in unnecessarily retarding the rate of production of the work, in exorbitant fastener costs and replacement expense, and in other faults that the workers encounter in using and maintaining the devices in operative condition.

An object of the present invention is to provide a new and improved temporary fastener that very largely minimizes the objections that have characterized the older forms of fastener.

Another object is to provide an improved temporary fastener that comprises a single piece plate hole occupying stub that is simple and strong in both design and construction and that maintains hole edges of superimposed plates in substantially concentric alignment without the assistance of supplemental wedging parts.

Another object is to provide a device comprising a support or frame part that is designed to be subjected to a minimum of bending torque when the device is gripped with a tool and applied to or removed from the work.

Another object is to provide a unique temporary fastener comprising a support or frame having a tool grip that permits the guided and the accurate application of the fastener to the work.

Another object is to provide a temporary fastener that is readily inserted in, secured to, and removed from the work with a minimum of exertion and effort on the part of the worker and that is entirely satisfactory in performance.

A further object is to provide a novel temporary fastener that consists of a minimum number of parts that are easily and rapidly manufactured and assembled.

Another object is to provide a temporary fastener that is simple and rugged in construction, that has a long performance life, and that is inexpensive as compared with other devices that are now available on the market for the same use or purpose.

With the above and other objects in view that will be apparent from the following description and that will be understood by those who are familiar with the use of temporary fasteners in connection with plate work and the like, an explanatory embodiment of the present invention is illustrated in the accompanying drawing, wherein.

Figure 1:
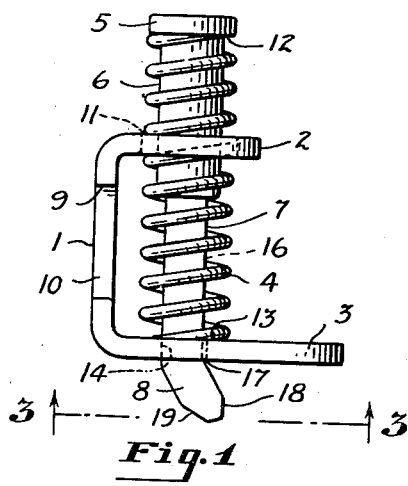
Fig. 1 is a side elevation of a fastener that embodies the present invention.
Figure 2:
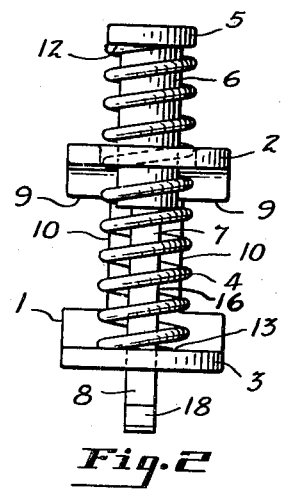
Fig. 2 is a front elevation of the fastener that is shown in Fig. 1.

The temporary fastener that is shown in the accompanying drawing, comprises a support or frame, and an operative or movable assembly that is mounted in the support and that comprises a plunger, and a resilient means that maintains the plunger normally upwardly of the support.

The support or frame part of the device, comprises the web 1, the guide flange 2, and the foot flange 3.

The operative or movable assemblage, that is preferably mounted in the support so that the common axis of its parts is substantially parallel with the plane of the support web 1, and normal to the planes of the support flanges 2 and 3, comprises the spiral spring 4, and the plunger that comprises the cap 5, the rod 6, the pin 7, and the stub 8.

Figure 4:
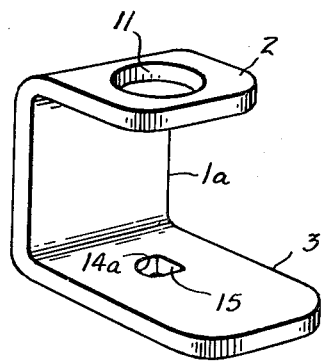
Fig. 4 is a perspective view of a modified support or frame of uniform lateral dimension thruout.

The support or frame portion of the device, when viewed from the side, as shown in Fig. 1 of the accompanying drawing, is shaped somewhat like the letter J, with the support foot flange 3 forming the longer leg thereof. The support or frame preferably is provided with a suitable tool engageable means that minimizes the bending torque to which the support is subjected when the device is in use. The preferred tool engageable means for the support, comprises the web tool lands 9 that are provided by the waisting in or the cutting away of the support web 1 to a desired degree between its junctions with the flange portions of the support, as where the support web 1 is cut in laterally to the web lateral edges 10, as shown. The web lateral edges 10 may be separated from each other any desired distance. In the modified form of support that is shown in Fig. 4 of the accompanying drawing, the support web 1a is of the same lateral width as the guide flange 2 and the foot flange 3. In either form of the support, the under side of the guide flange 2 may serve as a tool engageable means where the tool is preferably applied on the under side of the guide flange 2 and against the web 1, so that the tendency of bending the guide flange 2 with respect to the web 1, is minimized.

The operative or movable assemblage is mounted in the support so that the spring 4 and the plunger within the spring are disposed in an aperture in the support guide flange 2 and are guided in their reciprocating motion by the edge 11 of the aperture in the support guide flange 2. The edge 11 of the aperture in the support guide flange 2, serves as a friction surface for the mechanically unimpeded reciprocation of the coils of the spring 4, as the spring and the plunger are alternately depressed and released during the use of the device. The plunger is preferably maintained snugly in the spring 4, as by dimensioning the plunger rod 6 to substantially fill the radial inside of the coils of the spiral spring 4.

The spiral spring 4 is maintained normally under compression upwardly of the support or frame by positioning it between the plunger cap 5 and the support foot flange 3 in any suitable manner. In the construction shown, the upper end of the spring 4 is seated against the upper spring seat 12, that is disposed on the under side of the plunger cap 5, and the lower end of the spring 4 is seated on the lower spring seat 13 that is disposed on the upper side of the support foot flange 3. The lower spring seat 13 is positioned outwardly of the orifice in the support foot flange 3 that is defined by the support foot flange orifice edge 14. The plunger pin 7 makes frictional engagement against the support foot flange orifice edge 14 as the pin reciprocates in a direction that is disposed substantially normally with respect to the plane of the support foot flange 3.

Suitable means is provided for arresting the rotation of the plunger with respect to the support, so that the operator of the device may depend at all times on the direction in which the plunger pin stub 8 is extending with respect to the support foot flange 3. The preferred means for accomplishing this result comprises making one mating edge 15 part of the support foot flange orifice edge 14 of a contour that non-rotatably mates frictionally with a mating surface 16 that extends axially of the pin 7 to make frictional engagement on the axial reciprocation of the plunger part of the device, as by having one or more of the support foot flange orifice edges flat, as the mating edge 15, whether the support foot flange orifice is rectangular, as shown in Fig. 3, or is curved as the support foot flange orifice edge 14a that is shown in Fig. 4, with the plunger pin and stub of corresponding sectional contour.

Figure 3:
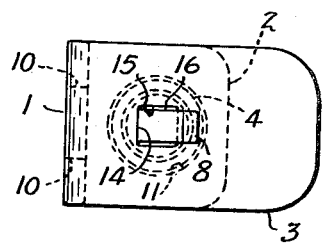
Fig. 3 is a plan view from below of the fastener that is shown in Fig. 1.

The plunger pin 7 and the pin stub 8 are preferably dimensioned so that their longer sectional dimension, when rectangular in section, as shown in Fig. 3, or when curved in section to slide in the orifice in the support foot flange shown in Fig. 4, preferably extends along the mid-line of the support foot flange 3, and are but slightly less than the diameter of the holes in the superimposed plates into which they are to be inserted, but sufficiently smaller so that the stub may be inserted readily thereinto.

The plunger pin stub 8 is inclined at a desired angle with respect to the axis of the pin 7, or with respect to the lower face of the support foot flange 3, so that its forward or inner elbow curve 17, at the junction of the pin 7 and its stub 8, engages the forward part of the edge of a plate hole thru which the pin stub 8 projects, to arrest the upward motion of the plunger under the force of the spring 4. The plunger stub 8 preferably terminates in the plate hole edge engaging forward land surface 18 and the rear land surface 19. The stub surfaces 18 and 19 together act as the faces of a wedge for forced insertion, where needed, between the edges of holes in superimposed plates and serve to assist in adjusting the plates so that the orifices are positioned in substantially concentric relation with respect to each other when the plunger pin 7 is disposed therein.

The portion of the support foot flange 3 that extends in the same direction as the pin stub 8 extends, may be of any desired length that is suitable for the service that the device is designed to perform. It has been found experimentally that where this portion of the support foot flange is substantially double the length of the pin stub the device functions satisfactorily.

Figure 5:
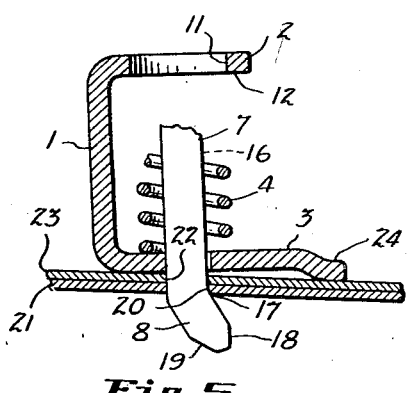
Fig. 5 is a fragmentary vertical section of a side elevation of parts of the assembly showing a modified support or frame that has a foot flange with a depressed forward edge.

When installed in registered holes in superimposed metal plates, as shown in Fig. 5 of the accompanying drawing, the inner elbow curve 17, at the junction of the pin stub 8 and the plunger pin 7, engages the forward part of the edge 20 of the hole in the lower plate 21, while the rear edge of the plunger pin 7 engages the rear part of the edge 22 of the hole in the upper plate 23, to cause the plate holes to be drawn into substantially concentric registration or alignment with respect to each other. Where desired, this result is assisted by depressing the forward edge 24 of the support floot flange 3, as shown in Fig. 5, particularly where the support is made of spring steel or the like. The depressed forward edge 24 of the support foot flange 3 has the further functional advantage of increasing the torque to which the plunger pin 7 is subjected in its engagement with the hole edges of the superimposed plates and thereby more firmly seats the pin in the plate holes.

In use the device is operated in any suitable manner by causing the depression of the plunger against the yielding resistance of the spring 4 until the pin 7 projects thru the support foot flange 3 a desired distance.

The preferred manner of operating the device is to position the single shafted jaw of a pair of pliers, not shown, on the top of the cap 5 and the divided, separated or tined jaw of the pliers in engagement with the support web tool lands 9 when it is desired that the plier handles extend to the left of the device as shown in Fig. 1, or with the tips of the tined jaw of the pliers beneath the guide flange 2 and against the web 1 or 1a when the operator prefers that the plier handles extend to the right of the device. When compression is then applied to the plier handles the plunger is depressed with respect to the support and the pin and stub are caused to project downwardly thru the support foot flange 2 a desired distance.

The device is adapted for use with equal mechanical efficiency whether the worker prefers to insert the plunger pin stub 8 into the plate holes in the work with a thrusting motion away from his body, or with a pulling motion toward his body. With either preferred grip of the device in the worker's pliers, the device is always gripped by the pliers in exactly the same position with respect to the pliers which assures the worker's sense of the position of the plunger pin stub 8, which is not visible to him thru the support foot flange 3.

It is to be understood that the fastener and its parts that are illustrated and described herein are submitted for the purposes of illustration and explanation of the present invention and that further modifications therein that have the same or corresponding functional advantages may be made in both the fastener and in the parts thereof without departing from the scope of the present invention as defined by the claims that are appended hereto.

What I claim is:

1. A temporary fastener for bringing holes in superimposed plates into substantially concentric registration with each other, comprising in combination, a substantially J-shaped support, a guide flange part of said support, a foot flange part of said support, a web part of said support connecting said guide flange with said foot flange, a tool land on said web, a plunger mounted in said support and extending thru apertures in said guide flange and said foot flange parts thereof, a cap part of said plunger forming the upper extremity thereof and providing a tool land on the top thereof, a rod part of said plunger depending from said plunger cap, a pin part of said plunger depending from said rod, a stub part of said plunger pin in angular relation therewith and extending from the lower end thereof, a spiral spring disposed in the plunger rod housing aperture in said support guide flange and having its axis substantially parallel with the plane of said support web part, an upper spring seat disposed on the under side of said plunger cap, a lower spring seat disposed on the upper side of said support foot flange and outwardly of the plunger housing orifice therein and said spring yieldingly normally maintaining said plunger upwardly of said support, and an inner elbow curve at the junction of said plunger pin and stub and engaging the edge of the orifice in said support foot flange for arresting the upwardly directed motion of said plunger under the force of said spring.

2. A temporary fastener, comprising in combination, a support, a foot flange part of said support, a pin substantially completely filling an aperture in said foot flange and adapted for yieldable sliding movement therethru substantially normally to said foot flange, means at the edge of said foot flange aperture for preventing the rotation of said pin in said foot flange aperture, and means on said pin and extending axially thereof for making mating engagement with said foot flange aperture edge means to prevent the rotation of said pin in said aperture.

3. A temporary fastener, comprising in combination, a support, a foot flange part of said support, a pin disposed in and substantially completely filling an aperture in said foot flange and adapted for movement normally of said foot flange, a part of said aperture edge making sliding engagement with a part of said pin, and a part of said pin surface extending axially thereof and making mating engagement with said aperture edge part for arresting the rotation of said pin in said aperture.

4. A temporary fastener for bringing holes in superimposed plates into substantially concentric registration with each other, comprising in combination, a substantially J-shaped support, a guide flange part of said support, a foot flange part of said support, a web part of said support connecting said guide flange with said foot flange, a downwardly facing tool land on said web, a plunger mounted in said support and extending thru apertures in said guide flange and said foot flange parts thereof, a cap part of said plunger forming the upper extremity thereof and providing an upwardly facing tool land on the top thereof, a rod part of said plunger depending from said plunger cap, a pin part of said plunger depending from said rod and having a cross sectional maximum dimension but slightly less than the diameter of the plate holes in which it is to be inserted, a stub part of said plunger pin in angular relation therewith and extending from the lower end thereof, a compression spring disposed in the plunger rod housing aperture in said support guide flange and having its axis substantially parallel with the plane of said web part of said support, an upper spring seat disposed on the under side of said plunger cap, a lower spring seat disposed on the upper side of said support foot flange and outwardly of the plunger housing orifice therein and said spring yieldingly normally maintaining said plunger upwardly of said support, and an inner elbow curve at the junction of said plunger pin and stub and engaging the edge of the orifice in said support foot flange for arresting the upwardly directed motion of said plunger under the force of said spring.

5. A temporary fastener for bringing holes in superimposed plates into substantially concentric registration with each other, comprising in combination, a substantially J-shaped support, a guide flange part of said support, a foot flange part of said support, a web part of said support connecting said guide flange with said foot flange, a tool land on said web, a plunger mounted in said support and extending thru apertures in said guide flange and said foot flange parts thereof, a cap part of said plunger forming the upper extremity thereof and providing a tool land on the top thereof, a rod part of said plunger depending from said plunger cap, a pin part of said plunger depending from said rod, a stub part of said plunger pin in angular relation therewith and extending from the lower end thereof, a spiral spring disposed in the plunger rod housing aperture in said support guide flange and having its axis substantially parallel with the plane of said support web part, an upper spring seat disposed on the under side of said plunger cap, a lower spring seat disposed on the upper side of said support foot flange and outwardly of the plunger housing orifice therein and said spring yieldingly normally maintaining said plunger upwardly of said support, an inner elbow curve at the junction of said plunger pin and stub and engaging the edge of the orifice in said support foot flange for arresting the upwardly directed motion of said plunger under the force of said spring, a forward land on said stub adjacent the end thereof, a rear land surface on said stub adjacent the end thereof and said stub lands together acting as the faces of a wedge for forced insertion between the edges of holes in superimposed plates for bringing the holes in substantially concentric registration with respect to each other.

6. A temporary fastener for bringing holes in superimposed plates into substantially concentric registration with each other, comprising in combination, a substantially J-shaped support, a guide flange part of said support providing a tool land on the under side thereof, a foot flange part of said support, a web part of said support connecting said guide flange with said foot flange, a plunger mounted in said support and extending thru apertures in said guide flange and said foot flange parts thereof, a cap part of said plunger forming the upper extremity thereof and providing a tool land on the top thereof, a rod part of said plunger depending from said plunger cap, a pin part of said plunger depending from said rod, a stub part of said plunger pin in angular relation therewith and extending from the lower end thereof, a spiral spring disposed in and guided in its flexing motion by frictional engagement with the rim of the plunger rod housing in said support guide flange and having its axis substantially parallel with the plane of said support web part, an upper spring seat disposed in the under side of said plunger cap, a lower spring seat disposed on the upper side of said support foot flange and outwardly of the plunger housing orifice therein and said spring yieldingly normally maintaining said plunger upwardly of said support, and an inner elbow curve at the junction of said plunger pin and stub and engaging the edge of the orifice in said support foot flange for arresting the upwardly directed motion of said plunger under the force of said spring.

CARL J. KOENIG.